United States Patent [19]

Edamoto et al.

[11] Patent Number: 5,637,422

[45] Date of Patent: Jun. 10, 1997

[54] NICKEL HYDRIDE SECONDARY CELL

[75] Inventors: Toshiyuki Edamoto, Otokuni-gun; Shuichi Wada, Settsu, both of Japan

[73] Assignee: Hitachi Maxell Ltd., Osaka-fu, Japan

[21] Appl. No.: 511,101

[22] Filed: Aug. 4, 1995

[30] Foreign Application Priority Data

Aug. 5, 1994 [JP] Japan ................. 6-204252

[51] Int. Cl.$^6$ ................. H01M 10/22; H01M 10/30
[52] U.S. Cl. ................. 429/207; 429/206; 429/202; 429/203; 429/223
[58] Field of Search ................. 429/202, 203, 429/206, 207, 59, 223

[56] References Cited

U.S. PATENT DOCUMENTS

| | | |
|---|---|---|
| 2,941,909 | 6/1960 | Johnson et al. ................. 429/207 |
| 3,418,166 | 12/1968 | Carter ................. 429/207 |
| 3,466,195 | 9/1969 | Spellman et al. ................. 429/207 |
| 4,273,841 | 6/1981 | Carlson ................. 429/199 |
| 5,096,667 | 3/1992 | Fetcenko ................. 420/580 |
| 5,215,836 | 6/1993 | Eisenberg ................. 429/199 |

*Primary Examiner*—Prince Willis, Jr.
*Assistant Examiner*—Carol Chaney
*Attorney, Agent, or Firm*—Birch, Stewart, Kolasch & Birch, LLP

[57] ABSTRACT

A nickel hydride secondary cell having a positive electrode which contains nickel oxide or nickel hydroxide, a negative electrode which contains a hydrogen occlusion alloy, and an electrolytic solution containing an alkali metal salt as a corrosion inhibitor, which cell has an increased maintenance rate of charge after storage.

7 Claims, 1 Drawing Sheet

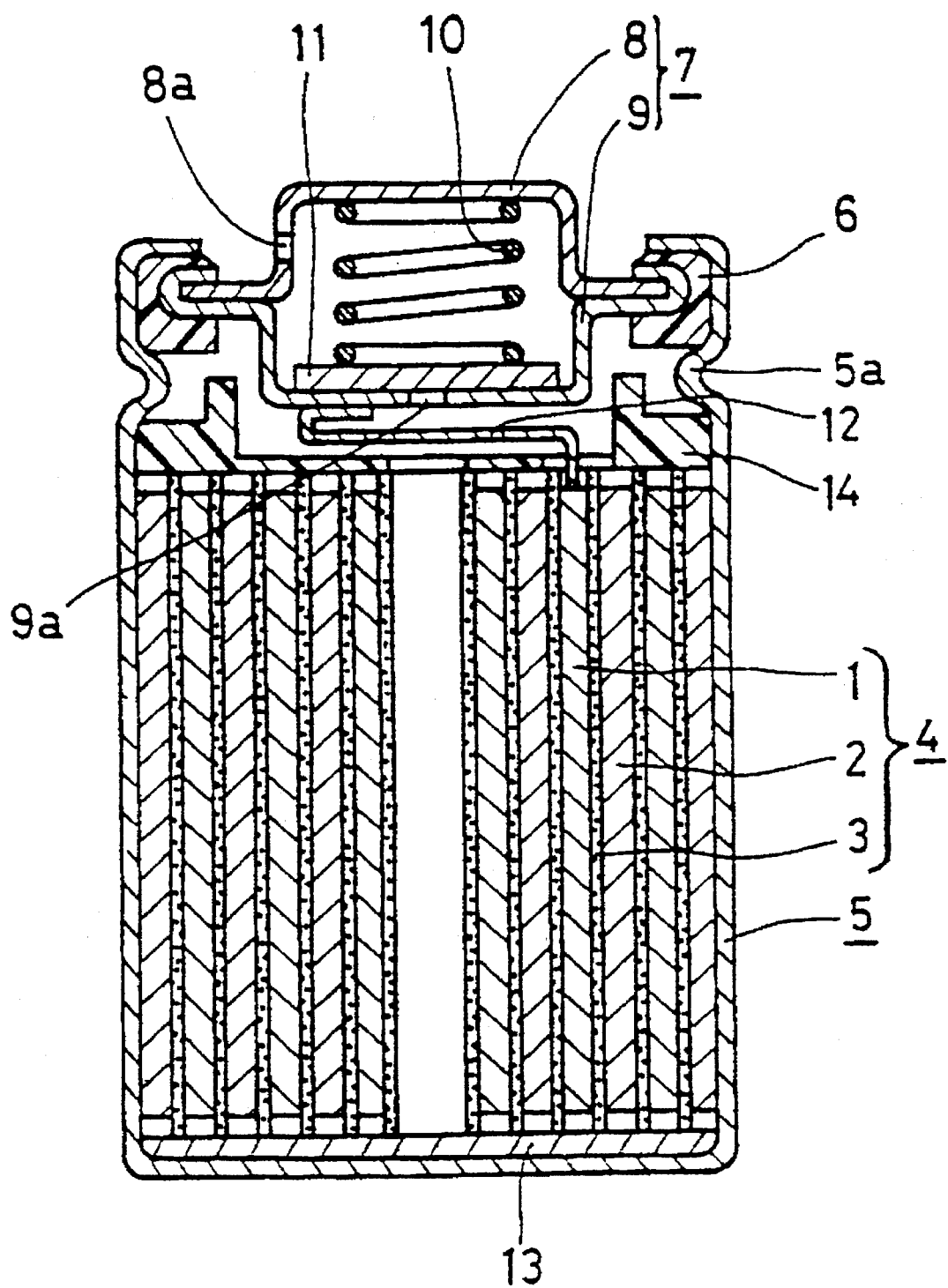

NICKEL HYDRIDE SECONDARY CELL

BACKGROUND OF THE INVENTION

1. Field of the Invention

The present invention relates to a nickel hydride secondary cell. In particular, the present invention relates to a nickel hydride secondary cell having an improved maintenance rate of capacity.

2. Description of the Related Art

A nickel hydride secondary cell comprising a hydrogen occlusion alloy as a negative electrode active material has a large charge-discharge capacity, and demand therefor will increase.

Among the hydrogen occlusion alloys, one comprising vanadium (V) is expected to have an increased amount of hydrogen to be occluded and liberated, and then attracts attention as a hydrogen occlusion alloy which can achieve a high capacity of a secondary cell.

However, since the vanadium alloy is easily corroded in an alkaline electrolytic solution, a nickel hydride secondary cell which uses a hydrogen occlusion alloy comprising vanadium has a low maintenance rate of capacity.

SUMMARY OF THE INVENTION

An object of the present invention is to solve the drawback of the nickel hydride secondary cell, that is, the low maintenance rate of capacity.

Another object of the present invention is to provide a nickel hydride secondary cell having a high maintenance rate of capacity even when a hydrogen occlusion alloy comprising vanadium is used in a negative electrode.

According to the present invention, there is provided a nickel hydride secondary cell comprising a positive electrode which comprises at least one nickel compound selected from the group consisting of nickel oxide and nickel hydroxide, a negative electrode which comprises a hydrogen occlusion alloy, and an electrolytic solution which comprises an aqueous alkaline solution, wherein said electrolytic solution contains at least one alkali metal salt selected from the group consisting of silicates, phosphates, chromates, chlorates and molybdates of alkali metals, as a corrosion inhibitor.

BRIEF DESCRIPTION OF THE DRAWING

The FIGURE is a schematic cross sectional view of one example of the secondary cell according to the present invention.

DETAILED DESCRIPTION OF THE INVENTION

In the present invention, as the silicate, a so-called polysilicate in which 2 to 4 oxygen atoms are bonded to one silicon atom is preferred. Specific examples of the alkali metal silicate are $K_2SiO_3$, $K_4Si_3O_8$, $K_4SiO_4$, $K_6SiO_6$, etc. Among them, $K_2SiO_3$ is preferred.

Specific examples of the alkali metal phosphate are $K_3PO_4 \cdot 3H_2O$, $K_4P_2O_7$, etc. Among them, $K_3PO_4 \cdot 3H_2O$ is preferred.

Specific examples of the alkali metal chromate are $K_2CrO_4$, etc.

Specific examples of the alkali metal chlorate are $KClO_3$, etc.

Specific examples of the alkali metal molybdate are $K_2MoO_4$, etc.

In addition, salts of sodium or lithium corresponding to the above potassium salts can be used.

A concentration of the corrosion inhibitor in the electrolytic solution is preferably from 0.01 to 0.2 mole/liter. When the concentration of the corrosion inhibitor is less than 0.01 mole/liter, the maintenance rate of capacity may not be sufficiently increased. When the concentration exceeds 0.2 mole/liter, a viscosity of the electrolytic solution increases so that a large current discharge characteristics of the cell may tend to decrease.

When at least one metal ion selected from the group consisting of a calcium ion, a zinc ion, a magnesium ion and a chromium ion is dissolved in the electrolytic solution containing the above corrosion inhibitor, the effect of preventing the decrease of capacity maintenance rate is improved, so that the maintenance rate of capacity is increased. Such metal ion is added to the electrolytic solution in the form of a metal compound such as a metal oxide. An amount of the ion is appropriately determined as an amount of the ion as such. But, it is inconvenient to measure the amount of ions in the solution. Then, an amount of the metal compound to be added to the electrolytic solution is conveniently used in place of the amount of the ion. In the present invention, the amount of the metal compound (in terms of an amount of a metal oxide) is preferably from 0.01 to 1 g/liter, more preferably from 0.05 to 5 g/liter.

According to the present invention, the corrosion of the hydrogen occlusion alloy is prevented by the dissolution of the specific corrosion inhibitor in the electrolytic solution, and then the maintenance rate of capacity is increased. But, accompanied with such improvement, the discharge characteristics of the cell tends to decrease at a low temperature. Such decrease of the discharge capacity can be prevented by the formation of a catalytic layer comprising a nickel alloy on the surface of the negative electrode.

When the catalytic layer comprising the nickel alloy is formed by sintering, at least one compound selected from the group consisting of nickel acetate, nickel chloride, nickel hydroxide and nickel nitrate is coated on the surface of the unsintered negative electrode and sintered.

The electrolytic solution comprises an aqueous alkaline solution. Examples of the aqueous alkaline solution are aqueous solutions of alkali metal hydroxides such as sodium hydroxide, potassium hydroxide, lithium hydroxide, etc.

In addition to the alkali metal ion, the electrolytic solution of the present invention contains the above corrosion inhibitor and optionally the metal ion such as the calcium ion, zinc ion, magnesium ion or chromium ion.

The negative electrode may be prepared by any of conventional methods such as a sintering method or a paste method. For example, the negative electrode is prepared by pressing a powder of the hydrogen occlusion alloy on a substrate made of a porous metal body such as a plain weave metal mesh, expanded metal, punched metal, foam metal, fiber metal, etc., and sintering the alloy powder. Alternatively, the powder of the hydrogen occlusion alloy is mixed with a binder and so on to form a paste, the paste is filled in pores of the above porous metal body and dried to obtain a composite, the composite is pressed to form a sheet, and then the sheet is heat treated.

In the present invention, the dissolution of the corrosion inhibitor in the electrolytic solution tends to decrease the discharge characteristics of the cell at the low temperature. To prevent this decrease of the discharge characteristics, the catalytic layer comprising the nickel alloy is often formed on the surface of the negative electrode. Then, the negative electrode prepared by the sintering method is preferred.

As the hydrogen occlusion alloy, any of known alloys may be used. Specific examples of the hydrogen occlusion alloy are TiZrVNiCr type alloys (e.g. $Ti_{15}Zr_{21}V_{15}Ni_{29}Cr_5Co_6Mn_8Fe_1$), TiNi type alloys, TiNiZr type alloys, LaNi type alloys, $M_mNi_3$ type alloys, and so on. In the present invention, a $AB_2$ type hydrogen occlusion ally comprising vanadium, in particular, the $AB_2$ type hydrogen occlusion alloy which comprises titanium, zirconium, vanadium, nickel, and at least one metal selected from the group consisting of chromium, cobalt, manganese, iron, aluminum and niobium is preferably used, since a high capacity of the cell is expected.

When the hydrogen occlusion alloy is used as the active material of the negative electrode, hydrogen gas is occluded during the charge of the cell, while it is liberated during the discharge of the cell. When the catalytic layer comprising the nickel alloy is formed on the surface of the negative electrode, the occlusion and liberation of the hydrogen gas are accelerated by the nickel in the catalytic layer, whereby the discharge characteristics of the cell at the low temperature is improved.

The negative electrode is made of the hydrogen occlusion alloy and the substrate. Preferably, the negative electrode does not contain any organic binder such as carboxymethylcellulose or polytetrafluoroethylene, since the binder forms carbon impurities in the sintering step, and the carbon may cause a methane gas.

A packing (bulk) density of the hydrogen occlusion alloy in the negative electrode (except the substrate) is preferably from 5.3 to 5.8 g/ml.

The positive electrode may be any of conventionally used ones. For example, the positive electrode is an electrode which is produced by a sintering method and comprises a substrate of a sintered nickel body in which nickel oxide or nickel hydroxide is filled, or an electrode which is produced by a paste method comprising steps of filling a paste containing nickel oxide or nickel hydroxide in pores of a substrate made of a porous metal body such as a metal mesh, expanded metal, punched metal, foam metal, fiber metal, etc., drying and pressing it to obtain a sheet, and heat treating the sheet.

Examples of the nickel oxide or hydroxide are nickel monoxide (NiO), nickel dioxide ($NiO_2$), nickel hydroxide [$Ni(OH)_2$], etc. These states of the compound are those when the positive electrode is in the discharged state. When the positive electrode is in the charged state, these compounds are present in other states.

EXAMPLES

The present invention will be illustrate by the following examples, which will not limit the scope of the present invention in any way.

In the Examples, "%" for a concentration of a solution or a dispersion is "wt. %".

Example 1

As a hydrogen occlusion alloy, there was used an $AB_2$ type hydrogen occlusion alloy having an average particle size of 45 µm and a composition of $Ti_{15}Zr_{21}V_{15}Ni_{29}Cr_5Co_6Mn_8Fe_1$.

A powder of this alloy was pressed integrally with an expanded metal of nickel with using no binder.

Then, a pressed composite of the hydrogen occlusion alloy and the expanded metal was sintered in an argon atmosphere containing 3 vol. % of hydrogen at 870° C. for 15 minutes. At this stage, an amount of the hydrogen occlusion alloy except the substrate of the negative electrode (expanded metal) was 6.8 g, and its packing density was 5.5 g/ml. Sizes of the negative electrode were 127 mm ×39 mm ×0.28 mm.

As a positive electrode, there was used a paste type nickel electrode which was produced by mixing nickel hydroxide (100 wt. parts), cobalt powder (9 wt. parts), a 2% aqueous solution of carboxymethylcellulose (52 wt. parts) and a 60% aqueous dispersion of polytetrafluoroethylene to form a paste, filling the paste in a foamed body of nickel, drying it at 80° C. for 2 hours, pressing it under pressure of 1 ton/cm², dipping the pressed body in an alkaline solution (30% aqueous solution of potassium hydroxide) for 2 hours, and washing it with water. Sizes of the paste type nickel electrode were 98 mm ×38 mm ×0.58 mm, and the charge capacity was 1200 mAh.

The above negative and positive electrodes were laminated with inserting a separator made of a polypropylene nonwoven fabric between them and spirally wound. Using the spirally wound electrode body, an AA type nickel hydride secondary cell shown in the FIGURE was assembled, and then activated (aged) at 70° C. for 24 hours. Thereafter, the cell was cooled to room temperature and charged at 0.2 CA for 7.5 hours and discharged at 0.2 CA down to 1.0 V. The charge and discharge were repeated twice to effect the formation of the cell.

The used electrolytic solution was a 30% aqueous solution of potassium hydroxide containing 17 g/l of lithium hydroxide and 0.1 mole/l of potassium silicate ($K_2SiO_3$) as a corrosion inhibitor. The cell contained 1.85 ml of this electrolytic solution.

Now, the cell of the FIGURE is explained more in detail. This cell comprises a spirally wound electrode body 4 which consists of a positive electrode 1, a negative electrode 2 and a separator 3, a cell case 5, an annular gasket 6, a sealing lid 7, a terminal plate 8, a sealing member 9, a metal spring 10, a valve member 11, a lead wire 12 for the positive electrode, and insulators 13 and 14.

The positive electrode 1 consists of the above described paste type nickel electrode, and the negative electrode 2 consists of the hydrogen occlusion alloy electrode produced by the sintering method. The separator 3 consists of the polypropylene nonwoven fabric which has been treated and made hydrophilic. The positive electrode 1 and the negative electrode 2 are laminated through the separator 3 and spirally wound to form the spirally wound electrode body 4, which is inserted in the cell case 5. Over the electrode body 4, the insulator 14 is placed.

The annular gasket 6 is made of, for example, nylon 66. The sealing lid 7 consists of the terminal plate 8 and the sealing plate 9. The opening of the cell case 5 is sealed by the sealing lid 7 and the annular gasket 6. That is, after placing the spirally wound electrode body 4, the insulator 14 and so on in the cell case 5, an annular groove 5a protruding inwardly is formed near an opening edge of the cell case 5. The lower face of the annular gasket 6 is supported by the inwardly protruded annular groove 5a, and the annular gasket 6 and the sealing lid 7 are placed in the opening of the cell case 5. Then, an upper wall edge of the cell case 5 above the groove 5a is clamped inwardly to seal the case opening by the sealing lid 7 and the annular gasket 6.

The terminal plate 8 has a vent hole 8a, and the sealing plate 9 has a gas detection hole 9a. Between the terminal plate 8 and the sealing plate 9, the metal spring 10 and the valve member 11 are placed. An outer peripheral part of the sealing plate 9 is folded back to grab the peripheral edge of the terminal plate 8 so as to fix the terminal plate 8 and the sealing plate 9.

Since the gas detection hole 9a is closed with the valve member 11 by a pressing force of the metal spring 10 under normal conditions, the interior of the cell is kept in a sealed state. If the internal pressure of the cell abnormally increases due to the generation of a gas in the cell, the metal spring 10 contracts, whereby a gap is formed between the valve member 11 and the gas detection hole 9a and the gas is evacuated outside the cell through the gas detection hold 9a and the vent hole 8a. Thereby, the burst of the cell is prevented.

Example 2

In the same manner as in Example 1 except that the electrolytic solution contained potassium phosphate trihydrate ($K_3PO_4 \cdot 3H_2O$) at a concentration of 0.1 mole/l in place of $K_2SiO_3$, a nickel hydride secondary cell was produced.

Example 3

In the same manner as in Example 1 except that the electrolytic solution contained potassium chromate ($K_2CrO_4$) at a concentration of 0.1 mole/l in place of $K_2SiO_3$, a nickel hydride secondary cell was produced.

Example 4

In the same manner as in Example 1 except that the electrolytic solution contained potassium chlorate ($KClO_3$) at a concentration of 0.1 mole/l in place of $K_2SiO_3$, a nickel hydride secondary cell was produced.

Example 5

In the same manner as in Example 1 except that the electrolytic solution contained potassium molybdate ($K_2MoO_4$) at a concentration of 0.1 mole/l in place of $K_2SiO_3$, a nickel hydride secondary cell was produced.

Comparative Example 1

In the same manner as in Example 1 except that no corrosion inhibitor was dissolved in the electrolytic solution, a nickel hydride secondary cell was produced.

Prior to the measurement of maintenance rates of capacity of the cells produced in Examples 1–5 and Comparative Example 1, an effect of the corrosion inhibitor for preventing the dissolution of vanadium from the alloy was evaluated in the preliminary test.

Preliminary Test

The hydrogen occlusion alloy used in Examples 1–5 and Comparative Example 1 (6.8 g) was dipped in the electrolytic solution (1.85 g) used in each of Examples 1–5 and Comparative Example 1 at 60° C. for 40 hours. Then, an amount of vanadium dissolved in the electrolytic solution was measured by the fluorescent X-ray analysis method. The results are shown in Table 1.

TABLE 1

| Electrolytic solution (Ex. No.) | Corrosion inhibitor | Dissolved amount of vanadium (ppm) |
| --- | --- | --- |
| Example 1 | $K_2SiO_3$ | 15 |

TABLE 1-continued

| Electrolytic solution (Ex. No.) | Corrosion inhibitor | Dissolved amount of vanadium (ppm) |
| --- | --- | --- |
| Example 2 | $K_3PO_4 \cdot 3H_2O$ | 22 |
| Example 3 | $K_2CrO_4$ | 28 |
| Example 4 | $KClO_3$ | 23 |
| Example 5 | $K_2MoO_4$ | 20 |
| Comp. Ex. 1 | None | 86 |

As seen from the results in Table 1, the amounts of dissolved vanadium in Examples 1–5 were smaller than that in Comparative Example 1. It is understood that the dissolution of the corrosion inhibitor in the electrolytic solution can prevent the dissolution of vanadium from the hydrogen occlusion alloy into the electrolytic solution.

Each of the cells produced in Examples 1–5 and Comparative Example 1 was charged at 0.2 C for 7.5 hours, stored at 45° C. for 3 days or at 20° C. for 30 days, and discharged at 20° C. to the end voltage of 1.0 V. Thereafter, the discharge capacity was measured, and a maintenance rate of capacity in relation to the discharge capacity before storage was calculated. Before storage, all the cells had the discharge capacity of 1100 mAh. The results are shown in Table 2.

TABLE 2

| | Maintenance rate of capacity (%) | |
| --- | --- | --- |
| Example No. | After storage at 45° C. for 3 days | After storage at 20° C. for 30 days |
| 1 | 82.9 | 70.9 |
| 2 | 81.1 | 70.5 |
| 3 | 80.6 | 70.0 |
| 4 | 80.2 | 70.8 |
| 5 | 82.2 | 70.9 |
| C. 1 | 73.0 | 59.4 |

As seen from the results of Table 2, the cells of Examples 1–5 had the higher maintenance rate of capacity than the cell of Comparative Example 1. It is clear that the corrosion inhibitors of the present invention can improve the maintenance rate of capacity.

Example 6

In the same manner as in Example 1 except that $K_2SiO_3$ was dissolved in the electrolytic solution in a concentration of 0.01 mole/l instead of 0.1 mole/l, a nickel hydride secondary cell was produced.

Example 7

In the same manner as in Example 1 except that $K_2SiO_3$ was dissolved in the electrolytic solution in a concentration of 0.2 mole/l instead of 0.1 mole/l, a nickel hydride secondary cell was produced.

Example 8

In the same manner as in Example 1 except that $K_2SiO_3$ and CaO were dissolved in the electrolytic solution in concentrations of 0.1 mole/l and 0.1 mole/l, respectively, a nickel hydride secondary cell was produced.

Example 9

In the same manner as in Example 1 except that $K_2SiO_3$ and ZnO were dissolved in the electrolytic solution in concentrations of 0.1 mole/l and 0.1 mole/l, respectively, a nickel hydride secondary cell was produced.

Example 10

In the same manner as in Example 1 except that $K_2SiO_3$ and MgO were dissolved in the electrolytic solution in concentrations of 0.1 mole/l and 0.1 mole/l, respectively, a nickel hydride secondary cell was produced.

Example 11

In the same manner as in Example 1 except that $K_2SiO_3$ and CrO were dissolved in the electrolytic solution in concentrations of 0.1 mole/l and 0.1 mole/l, respectively, a nickel hydride secondary cell was produced.

With each of the cells produced in Examples 6–11, a maintenance rate of capacity was measured in the same manner as in Example 1. Before storage, all the cells had the discharge capacity of 1100 mAh. The results are shown in Table 3 together with the result in Comparative Example 1.

TABLE 3

| Example No. | Maintenance rate of capacity (%) | |
|---|---|---|
| | After storage at 45° C. for 3 days | After storage at 20° C. for 30 days |
| 6 | 77.2 | 64.3 |
| 7 | 88.1 | 72.4 |
| 8 | 84.2 | 71.8 |
| 9 | 85.5 | 72.2 |
| 10 | 83.8 | 71.6 |
| 11 | 83.5 | 71.5 |
| C. 1 | 73.0 | 59.4 |

As seen from the results in Table 3, the cells of Examples 6–11 had the larger maintenance rate of capacity than the cell of Comparative Example 1.

Comparing the results of Examples 1, 6 and 7, it is said that, with the increase of the amount of $K_2SiO_3$ dissolved in the electrolytic solution, the maintenance rate of capacity increased.

When the calcium, zinc, magnesium or chromium ion was present in combination with the corrosion inhibitor in the electrolytic solution as in Examples 8–11, the maintenance rate of capacity was improved in comparison with Example 1.

Example 12

In the same manner as in Example 1, a powder of the hydrogen occlusion alloy was pressed integrally with an expanded metal of nickel with using no binder. Then, on the surface of the electrode powder layer, an aqueous solution of nickel acetate was coated and dried.

Thereafter, in the same manner as in Example 1, the pressed composite carrying a layer of the aqueous solution of nickel acetate was sintered in an argon atmosphere containing 3 vol. % of hydrogen at 870° C. for 15 minutes. An amount of the nickel metal in the catalytic layer formed on the surface of the negative electrode was 1 wt. % based on the weight of the hydrogen occlusion alloy.

In the same manner as in Example 1 except that the above produced negative electrode was used, a nickel hydride secondary cell was produced.

Example 13

In the same manner as in Example 12 except that an aqueous solution of nickel hydroxide was used in place of the aqueous solution of nickel acetate, a negative electrode was produced.

In the same manner as in Example 1 except that the above produced negative electrode was used, a nickel hydride secondary cell was produced.

With each of the cells produced in Examples 12 and 13, the maintenance rate of capacity was measured in the same manner as in Example 1. The results are shown in Table 4 together with the results of Examples 1 and 7 and Comparative Example 1.

Also, the discharge capacity of each cell was measured when the cell was discharged at 0° C., 0.5 A down to 1.0 V. The results are also shown in Table 4.

TABLE 4

| Example No. | Maintenance rate of capacity (%) | | Discharge capacity at 0° C., 0.5 A (mAh) |
|---|---|---|---|
| | After storage at 45° C. for 3 days | After storage at 20° C. for 30 days | |
| 1 | 82.9 | 70.9 | 840 |
| 7 | 88.1 | 72.4 | 560 |
| 12 | 87.5 | 66.9 | 1135 |
| 13 | 87.0 | 66.8 | 1130 |
| C. 1 | 73.0 | 59.4 | 920 |

As seen from the results of Table 4, like the cells of Examples 1 and 7, the cells of Examples 12 and 13 had the higher maintenance rate of capacity than that of Comparative Example 1.

As to the discharge capacity at 0° C., the cells of Examples 1 and 7 slightly suffered from the deterioration of the low temperature discharge characteristics because of the use of the corrosion inhibitor, while the cells of Examples 12 and 13 had the improved low temperature discharge capacity because of the formation of the catalytic layer comprising the nickel alloy on the surface of the negative electrode.

What is claimed is:

1. A nickel hydride secondary cell comprising a positive electrode which comprises at least one nickel compound selected from the group consisting of nickel oxide and nickel hydroxide, a negative electrode which comprises a hydrogen occlusion alloy, and an electrolytic solution which comprises an aqueous alkaline solution, wherein said electrolytic solution contains at least one alkali metal salt selected from the group consisting of silicates, phosphates, chromates, chlorates and molybdates of alkali metals, as a corrosion inhibitor.

2. The nickel hydride secondary cell according to claim 1, wherein said alkali metal silicate is $K_2SiO_3$, said alkali metal phosphate is $K_3PO_4 \cdot 3H_2O$, said alkali metal chromate is $K_2CrO_4$, said alkali metal chlorate are $KClO_3$, and said alkali metal molybdate is $K_2MoO_4$.

3. The nickel hydride secondary cell according to claim 1, wherein a concentration of said corrosion inhibitor in the electrolytic solution is from 0.01 to 0.2 mole/l.

4. The nickel hydride secondary cell according to claim 1, wherein said electrolytic solution further contains at least one metal ion selected from the group consisting of a calcium ion, a zinc ion, a magnesium ion and a chromium ion.

5. The nickel hydride secondary cell according to claim 1, wherein said hydrogen occlusion alloy comprises vanadium.

6. The nickel hydride secondary cell according to claim 1, wherein said hydrogen occlusion alloy is a hydrogen occlusion alloy which comprises titanium, zirconium, vanadium, nickel, and at least one metal selected from the group consisting of chromium, cobalt, manganese, iron, aluminum and niobium.

7. The nickel hydride secondary cell according to claim 1, wherein said negative electrode is an electrode made by a sintering method, and has, on its surface, a catalytic layer for accelerating the occlusion and liberation of hydrogen gas during charging and discharging, respectively, of the cell which catalytic layer is formed by coating at least one compound selected from the group consisting of nickel acetate, nickel chloride, nickel hydroxide and nickel nitrate on a surface of an unsintered negative electrode and sintering it.

* * * * *